(12) United States Patent
Weldon et al.

(10) Patent No.: US 6,679,984 B2
(45) Date of Patent: Jan. 20, 2004

(54) METHOD FOR RECOVERY OF GOLD AND SILVER

(75) Inventors: Todd A. Weldon, North Salt Lake, UT (US); Charles O. Gale, Helena, MT (US)

(73) Assignee: Summit Valley Equipment & Engineering Corp., North Salt Lake, UT (US)

( * ) Notice: Subject to any disclaimer, the term of this patent is extended or adjusted under 35 U.S.C. 154(b) by 283 days.

(21) Appl. No.: 09/839,928

(22) Filed: Apr. 20, 2001

(65) Prior Publication Data
US 2002/0179451 A1 Dec. 5, 2002

(51) Int. Cl.$^7$ .................... C25B 15/00; C25C 1/20; C25C 1/12
(52) U.S. Cl. ............ 205/349; 205/565; 205/571; 205/586
(58) Field of Search .................. 205/349, 565, 205/571, 586

(56) References Cited

U.S. PATENT DOCUMENTS 4,578,163 A * 3/1986 Kunter et al. ............... 205/569
4,732,609 A * 3/1988 Frey et al. .................. 423/24
5,073,354 A * 12/1991 Fuller et al. ................ 423/24
5,205,858 A * 4/1993 Manke ....................... 75/426

* cited by examiner

Primary Examiner—Donald R. Valentine
(74) Attorney, Agent, or Firm—Mallinckrodt & Mallinckrodt; Robert R. Mallinckrodt (57) ABSTRACT

An apparatus and method utilizing a strip solution for removing gold from the loaded activated carbon used to accumulate such gold leached from gold bearing ore, and for electrically removing such gold from the strip solution by electrowinning. The apparatus includes a pair of strip columns fillable with loaded activated carbon. The strip columns are connectable individually and in series in respective continuous loops using a valved crossover pipe assembly to an electrowinning device, with the strip solution being pumped therethrough. The loaded carbon in the first strip column is firstly partially stripped with the valved crossover pipes closed to flow, such stripping being completed therein by opening flow therebetween through the crossover pipes to serially connect the columns while the loaded carbon in the second strip column is being partially stripped, and closing the flow therebetween to complete the stripping in the second strip column, so as to more efficiently use the dynamics of the strip solution used therewith.

19 Claims, 10 Drawing Sheets

METHOD FOR RECOVERY OF GOLD AND SILVER

BACKGROUND OF THE INVENTION

1. Field

The invention is in the field of equipment and methods for recovery of gold and/or silver from ores by leaching using a cyanide solution, adsorption of the gold and/or silver in solution onto activated carbon, and elution of the adsorbed gold and/or silver-cyanide complex for subsequent recovery.

2. State of the Art

In the mining and related industries, gold is typically recovered from ores and other such solid materials by cyanide leaching using an aqueous sodium cyanide leachant. The gold in the leach solution is in the form of a gold cyanide complex. The gold in the pregnant leach solution is adsorbed onto activated carbon using a Carbon-In-Pulp (CIP) process, a Carbon-In-Leach (CIL) process, or a Carbon-In-Column (CIC) process. Silver is recovered in the same manner as gold and thus silver and silver-cyanide complex can be substituted, respectively, for gold and gold-cyanide complex in this specification, claims, and abstract.

The CIP adsorption process involves a plurality of tanks, called stages, containing activated carbon which are positioned in a cascading fashion with the pregnant pulp, an aqueous cyanide solution with finely ground leached ore in suspension, entering and flowing through the first stage and serially down through the subsequent stages with the gold-cyanide complex therein being adsorbed by the carbon and exiting from the last stage depleted of most of the gold-cyanide complex. Activated carbon is fed into the last stage and moved serially through the stages against the flow of the solution through and out of the first stage for subsequent removal of the adsorbed gold-cyanide complex thereon. The activated carbon in each stage becomes loaded to pseudo-equilibrium which depends on the concentration of the gold-cyanide complex in each particular stage. The activated carbon in the first stage has the highest gold loading and is contacted with the pulp having the highest concentration of gold, the highest grade solution, while the activated carbon in the last stage having the lowest gold loading is contacted with the lowest grade pulp, with such activated carbon having the highest activity so as to more efficiently remove the last of the gold from the solution.

The CIL absorption process is a modification of the CIP process wherein the leaching of the gold from finely ground ore using the cyanide solution and the adsorption thereof by the carbon are done simultaneously in the same tanks.

The CIC absorption process is used in leap and other bulk ore leaching processes wherein the leaching of the gold from ore using cyanide solution results in a primarily clear pregnant solution and the adsorbtion thereof is done in the same manner as the CIP adsorption circuit.

The adsorbed gold-cyanide complex is stripped from the activated carbon typically using one of the three elevated temperature methods, the pressure ZADRA, the pressure AARL (Anglo American Research Laboratory), and the split pressure AARL. In all three processes, weak sodium cyanide and caustic solutions are heated to near the boiling point of the aqueous solution, then routed through a bed of gold-cyanide complex loaded activated carbon under a specified system pressure.

The pressure ZADRA method utilizes a pressure strip vessel, or strip column wherein strip solution having a concentration of approximately 1% sodium hydroxide (NaOH), and approximately 0.1% to 0.3% sodium cyanide (NaCN) is heated to a temperature of between about 290° C. to 300° C. at a pressure of between about 400 kPa to 500 kPa and is pumped in ascension through a vertical bed of loaded carbon residing in the strip column and discharges through a nozzle located at the top of the strip column. As the solution contacts the gold-cyanide loaded activated carbon, the combination of caustic and cyanide reagents and elevated temperature reverses the chemical equilibrium of the adsorbed gold-cyanide complex on the activated carbon resulting in the desorption of the gold-cyanide complex from the activated carbon into the strip solution. The gold is then recovered down stream of the strip column by electrowinning the pregnant strip solution, or by using the Merrill Crowe process. The pressure ZADRA system is conducted in a batch-by-batch process and requires approximately eight to sixteen hours to complete. Therefore, a back-to-back strip sequence requires eight-plus-eight to sixteen-plus-sixteen hours, or between about sixteen and thirty-two hours to complete.

The pressure AARL method utilizes a pressure strip vessel, or strip column wherein the loaded activated carbon is pretreated with an approximately 3% NaCN and 1% NaOH solution for about thirty minutes. The loaded activated carbon is then eluted with six to eight bed volumes of deionized water at a temperature of between about 110° C. to 120° C. and a pressure of between about 70 kPa to 100 kPa, which is pumped in ascension through a vertical bed of carbon residing in the strip column and discharges through a nozzle located at the top of the strip column. As with the pressure ZADRA method, the strip solution contacts the gold-cyanide complex loaded activated carbon, the combination of caustic and cyanide reagents and elevated temperature reverses the chemical equilibrium of the adsorbed gold-cyanide complex on the activated carbon resulting in the desorption of the gold-cyanide complex therefrom. The gold is later recovered by electrowinning or by using the Merrill Crowe process. Like the pressure ZADRA method, the pressure AARL method is conducted in a batch-by-batch process and requires approximately eight to sixteen hours to complete. Therefore, a back-to-back strip sequence requires eight-plus-eight to sixteen-plus-sixteen hours, or between about sixteen and thirty-two hours to complete.

The split pressure AARL method is similar to the pressure AARL with the exception of the final four bed volumes of deionized water strip solution saved in an intermediate solution tank and is then used as the first four bed volumes of strip solution of the next strip sequence.

SUMMARY OF THE INVENTION

A method for eluting a metal-cyanide complex comprising a gold-cyanide complex and/or silver cyanide complex from loaded activated carbon contained in respective first and second vessels using a strip solution, for example an aqueous solution of sodium hydroxide and sodium cyanide, and recovering the precious metal comprising respective gold and silver therefrom. The vessels are selectively connectable in series and each vessel individually to a device for recovering the precious metal, such as by the Merrill-Crowe method or by electrowinning (hereinafter recovery of such precious metal by any such method and device referred to as elecrowinning using an electrowinning device), forming respective continuous loops. A strip solution is selectively flowable through the respective loops using a pump connected therewith.

The method comprises a first step of flowing the strip solution in a first continuous loop as barren strip solution from the electrowinning device through the loaded carbon in the first strip column and back through the electrowinning device. The strip solution elutes metal-cyanide complex from the loaded activated carbon to produce a pregnant strip solution and a partially depleted loaded activated carbon in the first strip column. The electrowinning device removes the eluted precious metal from the pregnant strip solution.

A second step of the method comprises flowing the strip solution in a second continuous loop as barren strip solution from the electrowinning device, through the partially depleted loaded carbon in the first strip column and the loaded carbon in the second strip column, and back through the electrowinning device. The strip solution elutes the remaining metal-cyanide complex from the partially depleted loaded activated carbon in the first strip column to produce a pregnant strip solution and a mostly depleted barren activated carbon in the first strip column. The pregnant strip solution continues through the second strip column containing loaded activated carbon wherein the strip solution elutes metal-cyanide complex from the loaded activated carbon in the second strip column to produce a further pregnant strip solution and a partially depleted loaded activated carbon in the second strip column. The electrowinning device removes the eluted precious metal from the pregnant strip solution.

A third step of the method comprises flowing the strip solution in a third continuous loop as barren strip solution from the electrowinning device through the partially depleted loaded carbon in the second strip column and back through the electrowinning device. The strip solution elutes the remaining metal-cyanide complex from the partially depleted loaded activated carbon in the second strip column to produce a pregnant strip solution and a mostly depleted barren activated carbon. The electrowinning device removes the eluted precious metal from the pregnant strip solution.

The steps of flowing the strip solution in first, second, and third continuous loops are preferably conducted with the strip solution at a temperature elevated above ambient temperature and at a pressure elevated above ambient pressure.

The method preferably includes preheating the strip solution to an elevated temperature prior to initially flowing the strip solution in the first continuous loop, such as at the beginning of a work day. The preheating is done by flowing the strip solution in a fourth continuous loop from the electrowinning device through one or more heating devices and back through the electrowinning device. This is done until the strip solution is heated to a temperature sufficient for stripping the loaded activated carbon.

The method can be conducted in a batch process which includes an initial step of loading the first and second strip columns with loaded activated carbon. The first, second, and third steps are then conducted, following which a final step of removing depleted activated carbon from the first and second strip columns and loading a fresh batch of loaded activated carbon into each of the first and second strip columns is conducted. The first, second, third, and final steps can be repeated sequentially, together constituting batches.

The method can be conducted in a multiple consecutive batch process which includes the same initial step as the batch process of loading the first and second strip columns with loaded activated carbon. The first, second, and third step are repeated multiple times wherein an intermediate step of removing any depleted activated carbon from the respective first and second strip columns and loading a fresh batch of loaded activated carbon into the respective first and second strip columns is conducted prior to each of the first and third steps. This process permits unloading of depleted activated carbon and reloading with fresh loaded activated carbon of the respective first and second strip columns during the solo stripping of the other thereof.

The method can be conducted in a faster multiple consecutive batch process which includes the same initial step as the batch process of loading the first and second strip columns with loaded activated carbon. The second step is the same as for the previous processes. An alternative third step is utilized which comprises flowing the strip solution in an alternative third continuous loop as barren strip solution from the electrowinning device, through the partially depleted loaded carbon in the second strip column and the loaded carbon in the first strip column, and back through the electrowinning device. The strip solution elutes the remaining metal-cyanide complex from the mostly depleted barren activated carbon in the first strip column to produce a pregnant strip solution and a partially depleted loaded activated carbon in the first strip column. The pregnant strip solution continues through the second strip column containing loaded activated carbon wherein the strip solution elutes metal-cyanide complex from the loaded activated carbon in the second strip column to produce a further pregnant strip solution and a partially depleted loaded activated carbon in the second strip column. The electrowinning device removes the eluted precious metal from the pregnant strip solution. The second and alternative third steps are repeated multiple times wherein an intermediate step of removing the depleted activated carbon from the respective first and second strip columns and loading a fresh batch of loaded activated carbon into the respective first and second strip columns is conducted prior to each of the first and the alternative third steps. This process permits quicker cycle times since the second step and the alternative third step are both conducted with the first and second strip columns simultaneously, with the depleted activated carbon being replaced by fresh activated carbon in both strip columns between the steps.

The apparatus is for practicing the method of the invention by eluting a metal-cyanide complex comprising a gold-cyanide complex and/or silver cyanide complex from loaded activated carbon using a strip solution. The apparatus is further for recovering the precious metal comprising respective gold and silver from a pregnant strip solution formed by the eluting the loaded activated carbon using the strip solution to form depleted activated carbon.

The apparatus includes respective first and second strip columns fillable with the loaded activated carbon. The strip columns include respective fluid inlets and outlets for the strip solution to enter and exit so as to pass through the loaded activated carbon. The strip columns are unloadable of stripped activated carbon. The apparatus further includes an electrowinning device for removing the precious metal from the pregnant strip solution. The electrowinning device includes a fluid inlet for admitting the pregnant strip solution and a fluid outlet for exiting barren strip solution. A supply pipe assembly permits selective fluid connection of each of the strip columns to the electrowinning device to comprise respective continuous fluid conveying first and second loops. A crossover pipe assembly permits selective fluid connection of the outlet of one of the strip columns with the inlet of the other of the strip columns to comprise a third continuous fluid conveying loop. A pump operationally associated with the supply pipe assembly conveys the strip solution through the first, second, and third loops. The strip solution can be selectively pumped in the first loop through the first strip column, the supply pipe assembly, and the electrowinning device. The strip solution can alternatively be selectively pumped in the second loop through the first strip column then through the second strip column, the crossover pipe assembly, the supply pipe assembly, and the electrowinning device. The strip solution can alternatively be selectively pumped in the third loop through the second strip column, the supply pipe assembly, and the electrowinning device so as to more efficiently use the dynamics of the strip solution used therewith.

Preferably the columns and loops are sealable such that pressure above ambient can be selectively maintained therein using the pump to permit higher operating temperatures.

Preferably the crossover pipe assembly comprises a fluid crossover pipe and a crossover valve. The crossover pipe includes respective fluid inlet and outlet ends, the inlet end thereof being fluidly connected to the fluid outlet of the first strip column, and the outlet end thereof being fluidly connected to the fluid inlet of the second strip column. The crossover valve is disposed along the length of the crossover pipe for regulating the flow of strip solution therethrough.

Preferably the crossover pipe assembly further comprises a second fluid crossover pipe and crossover valve. The second crossover pipe includes respective fluid inlet and outlet ends, the inlet end thereof being fluidly connected to the fluid outlet of the second strip column, and the outlet end thereof being fluidly connected to the fluid inlet of the first strip column. The second crossover valve is disposed along the length of the second crossover pipe for regulating the flow of strip solution therethrough.

Preferably a heating device is connected to the supply pipe assembly between the fluid outlet of the electrowinning device and the fluid inlets of the first and second strip columns. The heating device heats the flow of strip solution prior to entering the first and second strip columns.

Preferably a cooling device is connected to the supply pipe assembly between the fluid outlets of the first and second strip columns and the fluid inlet of the electrowinning device. The cooling device cools the flow of strip solution prior to entering the electrowinning device.

Preferably the supply pipe assembly further comprises a bypass pipe and a bypass valve. The bypass pipe includes respective fluid inlet and outlet ends, the fluid inlet end thereof being fluidly connected intermediate the fluid inlets of the strip columns and the heating device, and the fluid outlet end thereof being fluidly connected ahead of the inlet of the electrowinning device. The bypass valve is disposed along the length of the bypass pipe for regulating the flow of strip solution therethrough. The bypass valve permits selective bypass of the strip solution exiting the heating device to the electrowinning device and back through the heating device in a continuous loop for preheating the strip solution prior to entering the strip columns.

THE DRAWINGS

The best mode presently contemplated for carrying out the invention is illustrated in the accompanying drawings, in which.

DETAILED DESCRIPTION OF THE ILLUSTRATED EMBODIMENTS

Pressure ZADRA Apparatus

Figure 1:
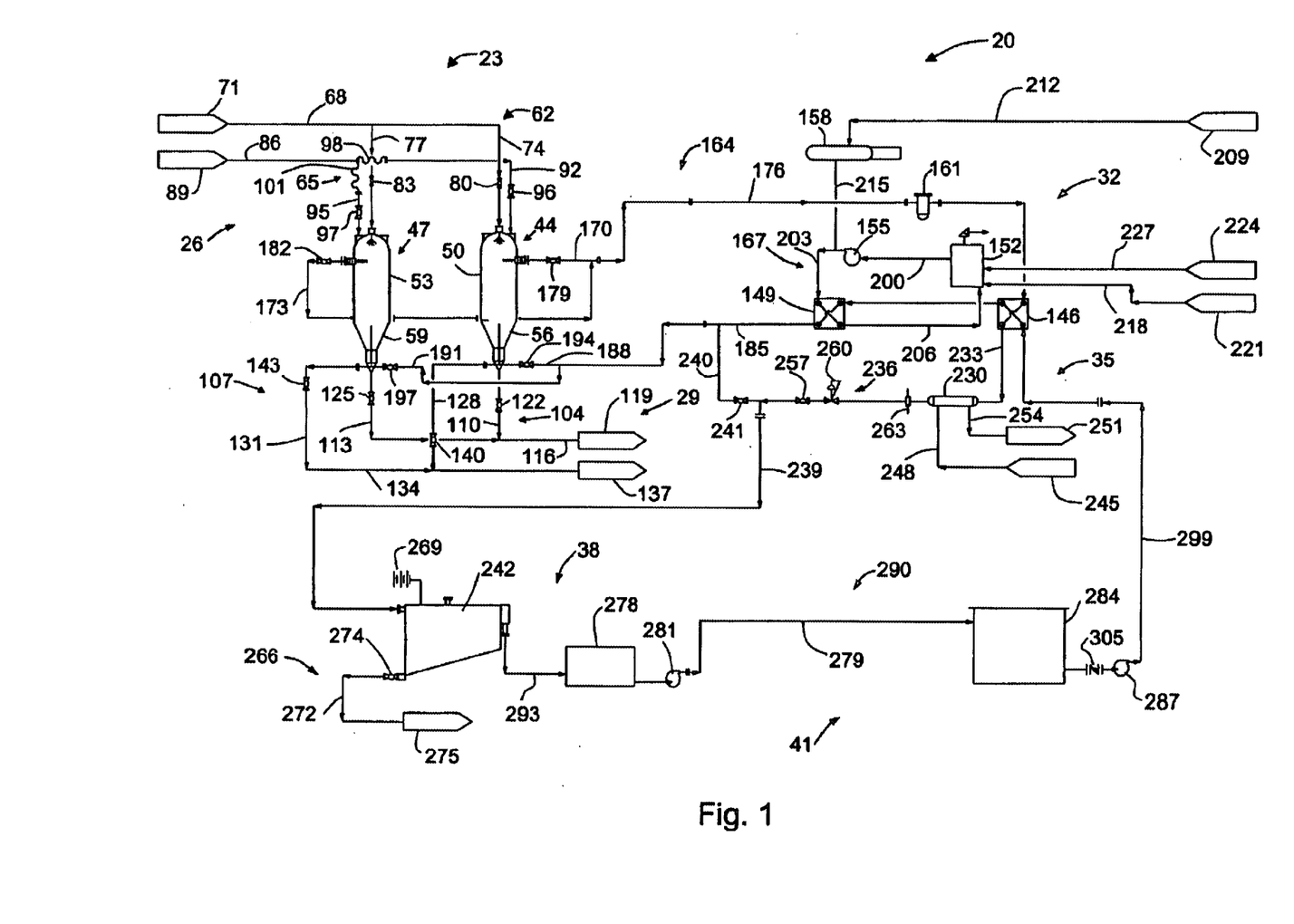
FIG. 1 is a schematic diagram of a pressure ZADRA apparatus utilizing two strip columns used in an alternating fashion for the pressure ZADRA method for removal of gold from activated carbon.

Referring to FIG. 1, therein is shown a schematic diagram of a pressure ZADRA apparatus used to practice a pressure ZADRA method of gold removal from loaded activated carbon. The apparatus, pressure ZADRA apparatus 20, comprises a strip solution/carbon introduction system 23, a strip column system 26, a strip solution/carbon removal system 29, a strip solution heating system 32, a strip solution cooling system 35, an electrowinning system 38, and a strip solution tank/pump system 41.

Strip Column System: Strip column system 26 comprises first and second strip columns 44 and 47 having respective upper portions 50 and 53 adapted for introduction of loaded activated carbon and barren strip solution, and lower portions 56 and 59 adapted for removal of stripped activated carbon and strip solution.

Barren Solution/Carbon Introduction System: Barren solution/carbon introduction system 23 comprises a barren strip solution inlet system 62 and a loaded activated carbon introduction system 65. Inlet system 62 comprises a main inlet pipe 68 which connects a barren strip solution source 71 to a pair of inlet pipes 74 and 77 of inlet system 62 entering into respective upper portions 50 and 53 of strip columns 44 and 47, and a pair of valves 80 and 83 along respective inlet pipes 74 and 77 for control of the respective flows of barren strip solution therethrough. Carbon introduction system 65 comprises a main inlet pipe 86 which connects a loaded activated carbon source 89 to a pair of inlet pipes 92 and 95 of carbon introduction system 65 leading into respective upper portions 50 and 53 of strip columns 44 and 47, with a pair of valves 96 and 97 and a pair of flexible coupling connections 98 and 101 disposed along respective inlet pipes 92 and 95 for directing the respective flows of loaded activated carbon therethrough.

Strip Solution/Carbon Removal System: Strip solution/carbon removal system 29 comprises a strip column solution drainage system 104 and a stripped activated carbon removal system 107. Drainage system 104 comprises a pair of outlet pipes 110 and 113 which connect respective lower portions 56 and 59 of strip columns 44 and 47 to a main outlet pipe 116 of outlet system 104 leading to a sump 119 for disposal, and a pair of drain valves 122 and 125 disposed along respective outlet pipes 110 and 113 for control of the respective flows of barren strip solution therethrough. Carbon removal system 107 comprises a pair of outlet pipes 128 and 131 which connect respective lower portions 56 and 59 of strip columns 44 and 47 to a main outlet pipe 134 of removal system 107 leading into a stripped carbon receptacle 137 for subsequent reactivation, or other treatment of the carbon, and a pair of carbon removal valves 140 and 143 disposed along respective outlet pipes 128 and 131 for control of the flow of stripped carbon from strip columns 44 and 47.

Strip Solution Heating System: Strip solution heating system 32 comprises a pair of heat exchangers 146 and 149, a water heater 152, a hot water recirculation pump 155, an expansion tank 158, a bucket trap 161, a strip column to heating system piping system 164, and a closed heating water piping system 167. Piping system 164 comprises a pair of outlet pipes 170 and 173 which connect respective upper portions 50 and 53 of strip columns 44 and 47 to a main outlet pipe 176 of piping system 164 leading to heat exchanger 146, and a pair of valves 179 and 182 along respective outlet pipes 170 and 173 for control of the respective flows of barren strip solution therethrough. Piping system 164 further includes a main inlet pipe 185 which connects heat exchanger 149 to a pair of inlet pipes 188 and 191 entering into respective lower portions 56 and 59 of strip columns 44 and 47, and a pair of valves 194 and 197 along respective inlet pipes 188 and 191 for control of the respective flows of barren strip solution therethrough.

Closed Heating Water Piping System: Closed heating water piping system 167 comprises pipes 200, 203, and 206 which connect water heater 152, hot water recirculation pump 155, and heat exchanger 149 in a continuous loop for circulation of hot water therethrough. Expansion tank 158 is partially filled with water and connected to a pressurized supply of air 209 by means of a pipe 212, and to pipe 203 by means of a pipe 215 such that a constant pressure is maintained on the circulating hot water. Water is added to water piping system 167 as needed to make-up for water lost therefrom due to system leaks via a pipe 218 which connects a water supply 221 to water heater 152. Water heater 152 is supplied with diesel fuel from a diesel fuel supply 224 through a pipe 227. Water heater 152 may be any suitable heating device electric or combustion fired.

Strip Solution Cooling System: Strip solution cooling system 35 comprises a heat exchanger 230, a heating system to cooling system pipe 233, and a cooling system to electrowinning system piping system 236. Pipe 233 connects heat exchanger 146 to heat exchanger 230, with a pipe 239 of piping system 236 connecting heat exchanger 230 to an electrowinning device 242 of electrowinning system 38. Heat exchanger 230 is supplied with cooling water from a cooling water supply source 245 by means of a pipe 248 and the warmed cooling water disposed of into a cooling water return 251 by means of a pipe 254. A valve 257 is disposed along pipe 239 for regulating the flow of strip solution therethrough and a back pressure valve 260 maintains system pressure. A flow meter 263 can also be disposed along pipe 239 for purposes of monitoring the flow rate of strip solution.

A bypass pipe 240 and bypass valve 241 allow the flow of initially cold strip solution at start-up to flow in a continuous loop from heat exchanger 149 through pipes 185, 239, and 240 to the electrowinning device 242, through pipe 293 back to strip solution tank 284 by opening bypass valve 241 and closing valve 257. The purpose of this bypass is to preheat the cold strip solution to a temperature of approximately 150 F. prior to stripping.

Electrowinning System: Electrowinning system 38 comprises electrowinning device 242 and a gold sludge removal piping system 266. Electrowinning device 242 is supplied with direct current through a rectifier assembly 269 from an alternating current power source (not shown) such as standard 110, 220, or 440 volt electric utilities. Gold sludge removal piping system 266 includes an outlet pipe 272 which connects electrowinning device 242 through a valve 274 to an outlet 275 leading to a pump and a filter press (not shown) for removal of the liquid strip solution from the gold sludge. The strip solution is collected in tank 278 and is pumped using pump 281 to tank 284.

Strip Solution Tank/Pump System: The strip solution tank/pump system 41 comprises a barren strip solution pump tank or box 278, a barren strip solution return pump 281, a barren strip solution tank 284, a strip solution feed pump 287, and a barren strip solution piping system 290. Piping system 290 includes a pipe 293 which connects electrowinning device 242 to barren strip solution pump box 278, a pipe 279 which connects tank 278 to barren strip solution tank 284, with return pump 281 disposed therealong to boost the flow of barren strip solution from tank 278 to heated tank 284, and a pipe 299 which connects tank 284 to heat exchanger 146 with feed pump 287 disposed therealong to pump the barren strip solution from heated tank 284 back to strip columns 44 and 47. A valve 305 of piping system 290 is disposed between heated tank 284 and feed pump 287 to permit isolation of the heated tank 284 from the feed pump 287.

Operation of the Pressure ZADRA Apparatus

Figure 2:
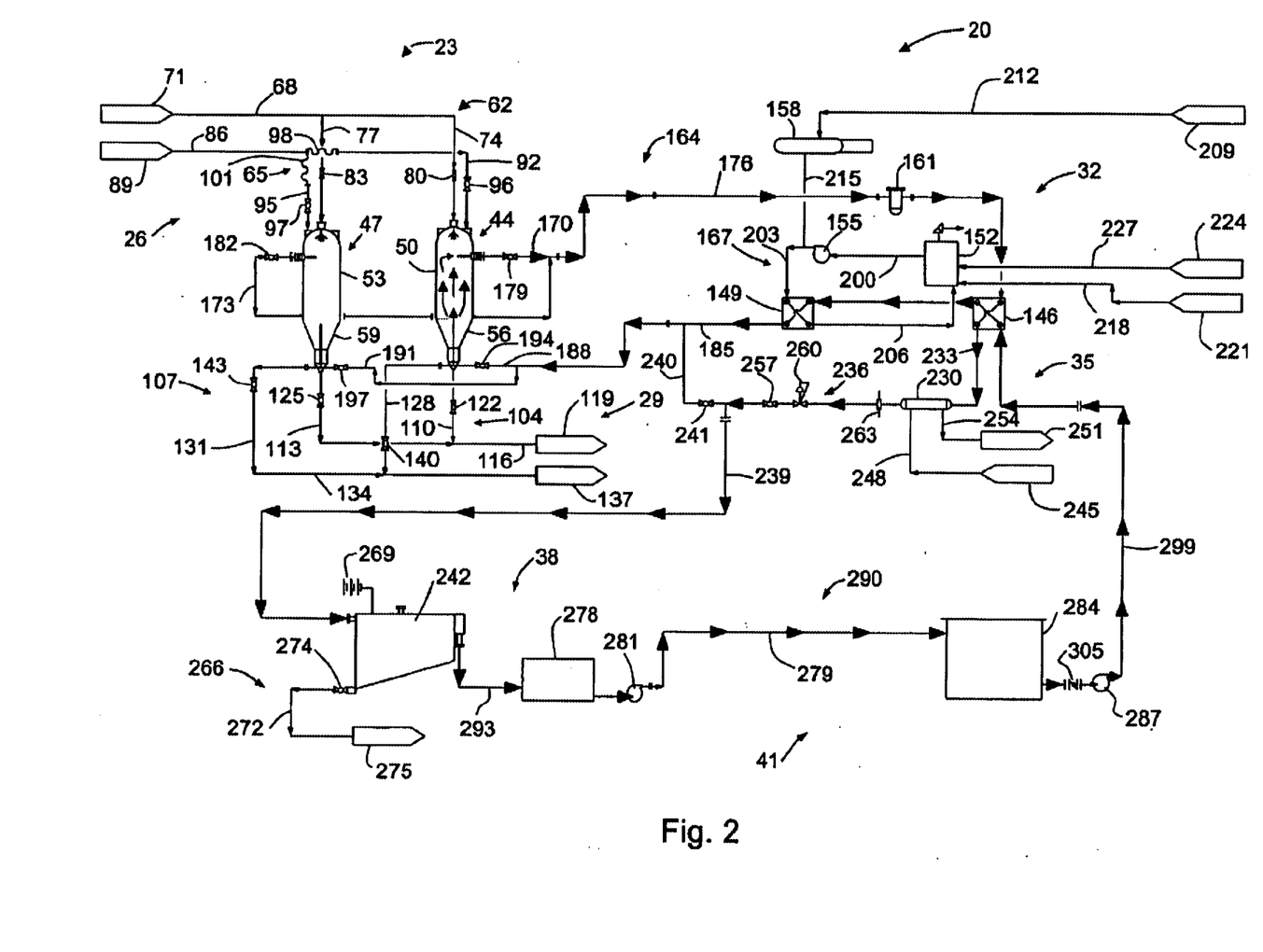
FIG. 2, a schematic diagram of the flow of strip solution through the pressure ZADRA apparatus when utilizing the first strip column.

Referring to FIG. 2, pressure ZADRA apparatus 20 is operated by filling strip column 44 with loaded activated carbon from loaded activated carbon source 89 through pipe 86, flexible coupling 98, and pipe 92 into strip column 44. Barren strip solution is then added from barren strip solution source 71 through pipes 68 and 74 into strip column 44 to fill strip column 44 and the remainder of pressure ZADRA apparatus 20. The flow of strip solution through pressure ZADRA apparatus 20 during a first strip phase of first strip column 44 is shown by the arrows with valves 179, 194, and 257 being open, and valves 80, 83, 96, 97, 122, 140, 143, 182, 197, 241, 323, 329, and 350 being closed. The first strip phase comprises pumping strip solution from barren strip solution heated tank 284 through pipe 299 through heat exchanger 146 where the strip solution is heated by pregnant strip solution flowing through heat exchanger 146 from strip column 44. The barren strip solution is further heated in heat exchanger 149 by heating water circulated through strip solution heating system 32. The full heating of the strip solution to operating temperature when starting with cold strip solution such as at the initial start-up of pressure ZADRA apparatus 20 requires several cycles through heat exchangers 146 and 149. The barren strip solution flows through open valve 194 into lower portion 56 of first strip column 44 flowing upwardly through the loaded activated carbon contained therein and exits as pregnant strip solution from upper portion 50 thereof through outlet pipe 170, open valve 179, and bucket trap 161 back through heat exchanger 146. Heat is transferred within heat exchanger 146 from the pregnant strip solution to the barren strip solution, the pregnant strip solution being further cooled within heat exchanger 230 by cooling water from strip solution cooling system 35. The cooled pregnant strip solution flows through pipe 239, back-pressure valve 260, and open valve 257 into electrowinning device 242 wherein the gold contained therein is electrictro-chemically removed as is known in the industry. The now barren strip solution exits electrowinning device 242 through pipe 293 and flows into barren strip solution pump box 278 wherein it is accumulated for pumping through a pipe 279 by means of barren strip solution return pump 281 to barren strip solution heated tank 284. The barren strip solution is then pumped back through pipe 299 to resume the strip cycle.

Figure 3:
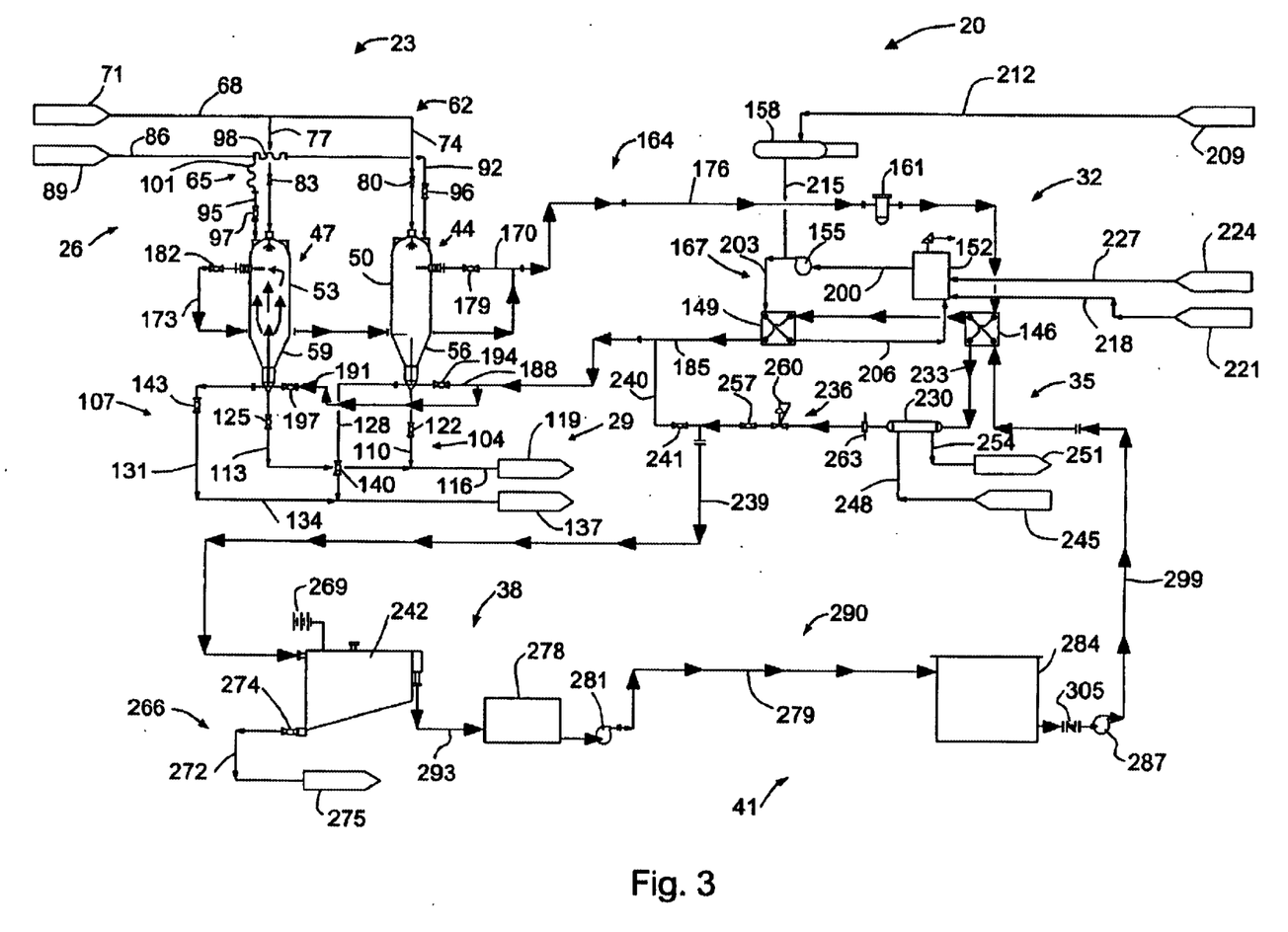
FIG. 3, a schematic diagram of the flow of strip solution through the pressure ZADRA apparatus when utilizing the second strip column.

Referring to FIG. 3, pressure ZADRA apparatus 20 is secondly operated by filling strip column 47 with loaded activated carbon from loaded activated carbon source 89 through pipe 86, flexible coupling 101, and pipe 95 into strip column 47. Barren strip solution is then added from barren strip solution source 71 through pipes 68 and 77 into strip column 47 to fill strip column 47 and the remainder of pressure ZADRA apparatus 20. The flow of strip solution through pressure ZADRA apparatus 20 during the second strip cycle is shown by the arrows with valves 182, 197, and 257 being open, and valves 83, 97, 122, 125, 140, 143, 179, 194, 241, and 350 being closed. The second strip cycle comprises pumping strip solution from barren strip solution tank 284 through pipe 299 through heat exchanger 146 where the solution is heated by pregnant strip solution flowing through heat exchanger 146 from strip column 47. The barren strip solution is further heated in heat exchanger 149 by heating water circulated through strip solution heating system 32. The full heating of the strip solution to operating temperature when starting with cold strip solution such as at the initial start-up of the pressure ZADRA apparatus 20 requires several cycles through the heat exchangers 146 and 149. The barren strip solution flows through open valve 197 into lower portion 59 of second strip column 47 flowing upwardly through the loaded activated carbon contained therein and exits as pregnant strip solution from upper portion 53 thereof through outlet pipe 173, open valve 182, and bucket trap 161 back through heat exchanger 146. Heat is transferred within heat exchanger 146 from the pregnant strip solution to the barren strip solution, the pregnant strip solution being further cooled within heat exchanger 230 by cooling water from strip solution cooling system 35. The cooled pregnant strip solution flows through pipe 239, back-pressure valve 260, and open valve 257 into electrowinning device 242 wherein the gold contained therein is electro-chemically removed as is known in the industry. The now barren strip solution exits electrowinning device 242 through pipe 293 and flows into barren strip solution pump box 278 wherein it is accumulated for pumping through a pipe 279 by means of barren strip solution return pump 281 to barren strip solution tank 284. The barren strip solution is then pumped back through pipe 299 to resume the strip cycle.

The purpose of having first and second strip columns 44 and 47 is after the gold-cyanide complex is removed from the loaded activated carbon contained within first strip column 44 and while the gold-cyanide complex is being stripped from the loaded activated carbon contained within the second strip column, the stripped activated carbon contained within first strip column 44 can be removed. This is accomplished by first opening valve 80 and then opening valve 140 to allow stripped activated carbon contained within first strip column 44 to be drained therefrom through pipes 128 and 134 into stripped carbon receptacle 137. First strip column 44 can then be refilled with loaded activated carbon for a subsequent strip cycle.

Likewise, after the gold-cyanide complex is stripped from the loaded activated carbon contained within second strip column 47 and while the gold-cyanide complex is being stripped from the loaded activated carbon contained within first strip column 44, the stripped activated carbon contained within second strip column 47 can be removed. This is accomplished by first opening valve 83 and then opening valve 143 to allow stripped activated carbon contained within second strip column 47 to be drained therefrom through pipes 131 and 134 into stripped carbon receptacle 137. Second strip column 47 can then be refilled with loaded activated carbon for a subsequent strip cycle.

Strip Solution Dynamics

Figure 4:
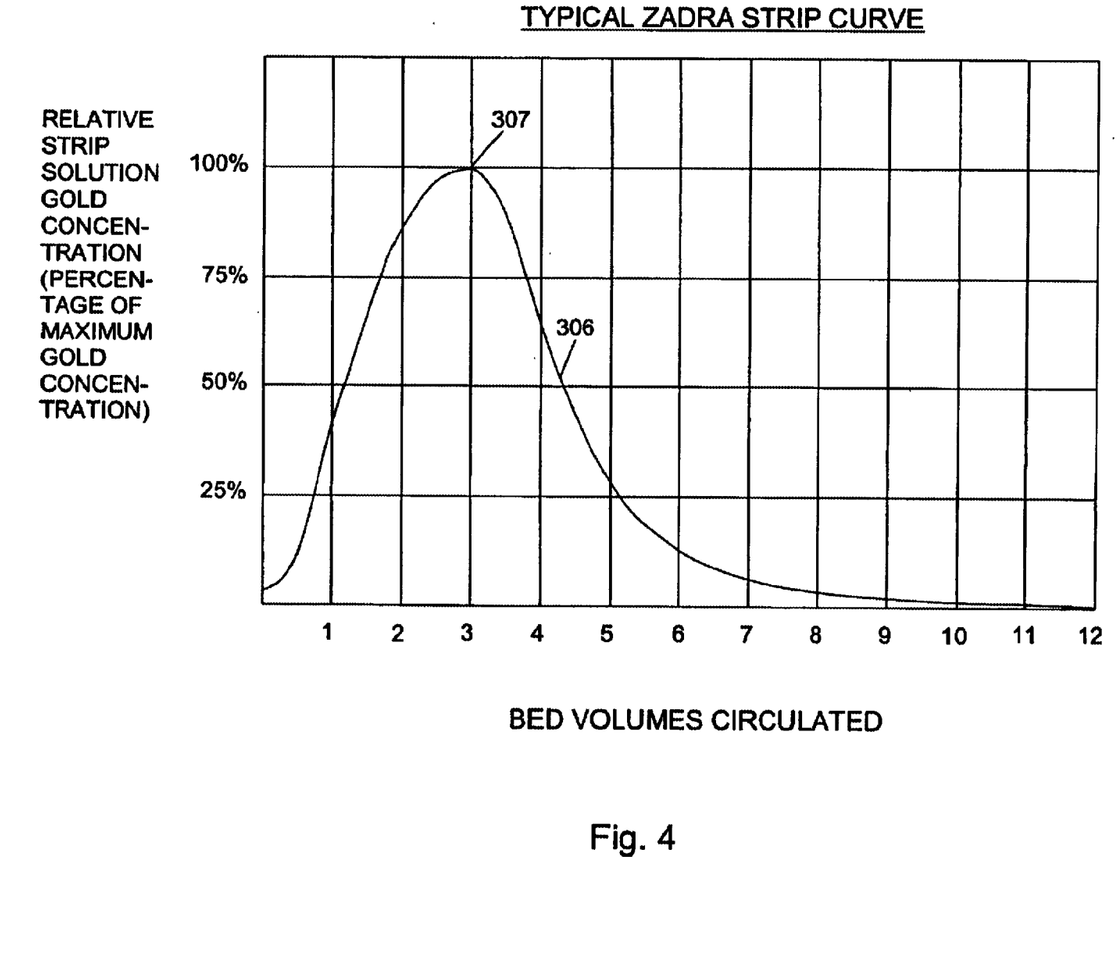
FIG. 4, a graph showing a typical pressure ZADRA strip curve of strip solution gold concentration in the strip solution exiting the strip column as a function of the specific bed volume being circulated.

Referring to FIG. 4, therein is shown a typical strip curve 306 for the pressure ZADRA method. Strip curve 306 plots the relative strip solution gold concentration (i.e. the relative amount of gold removed from the loaded carbon) exiting the strip column for each particular bed volume circulated, with the maximum strip solution gold concentration occurring at point 307, approximately the third bed volume circulated (Note that it is assumed that the majority of the gold is removed by electrowinning between each bed volume circulated such that no significant amount of gold is carried over from one bed volume circulated to the next.). During the first bed volume circulated, the relative strip solution gold concentration is about 25% of the maximum. Likewise, the relative gold concentration of the second bed volume circulated is about 87% of the maximum. This is because the hot strip solution of 290° C. nominal temperature first must heat the cold carbon bed in order to desorbe, or strip the gold-cyanide complex. Once the carbon is sufficiently hot, the maximum amount of the gold-cyanide complex is removed at the approximate third bed volume circulated. Subsequent bed volumes circulated remove a continually lesser amount of gold since the source thereof in the gold-cyanide complex on the loaded carbon depletes. Therefore, the efficiency of the pressure ZADRA method decreases dramatically following the third bed volume circulated, and the strip solution has additional capacity to carry gold which is not being utilized due to the depletion of gold-cyanide complex on the loaded carbon. Utilizing this unused gold carrying capacity is the focus of the split pressure ZADRA method of the invention as explained subsequently.

Split Pressure ZADRA Apparatus

Figure 5:
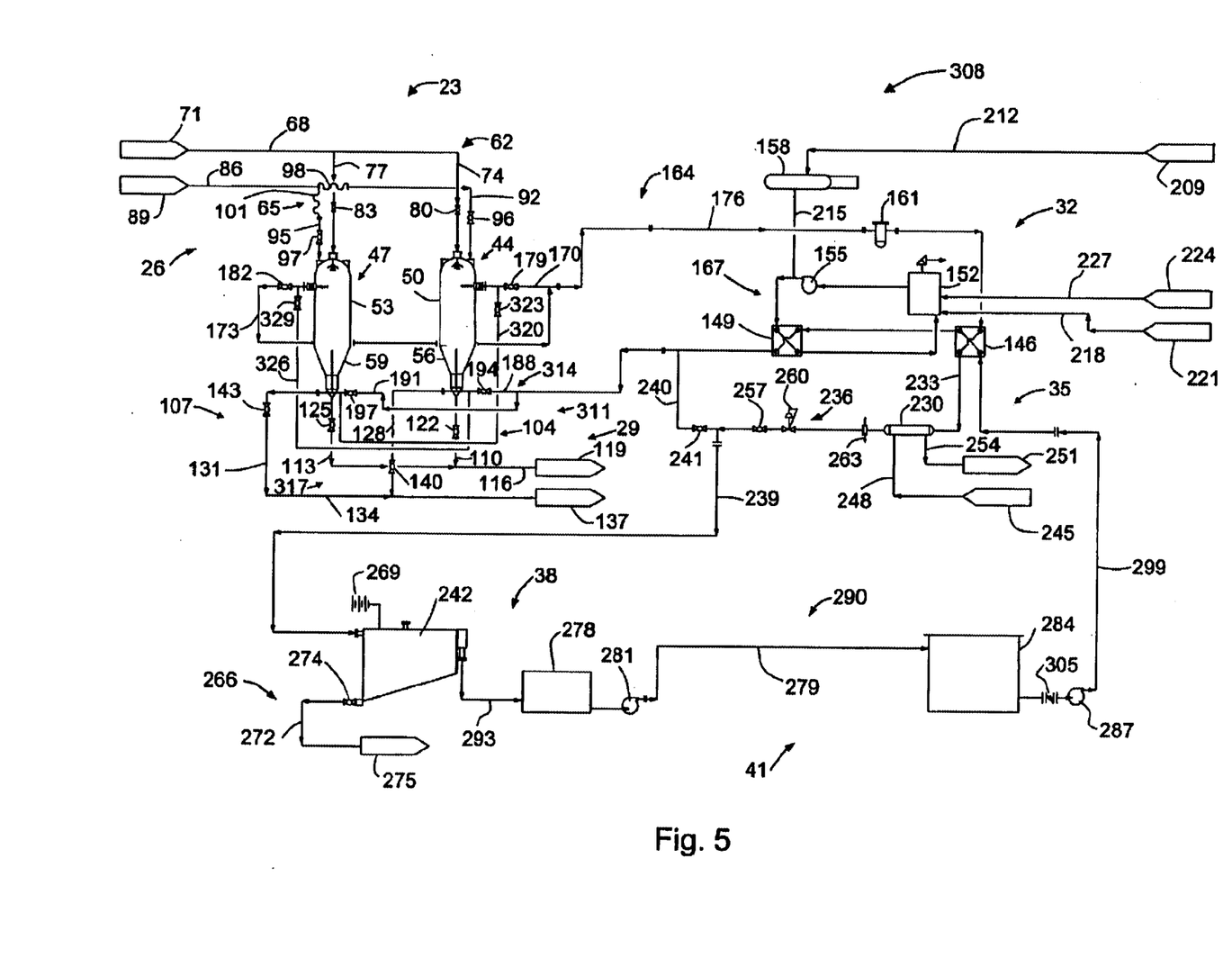
FIG. 5, a schematic diagram of a split pressure ZADRA apparatus of the invention, utilized in practicing the split pressure ZADRA method of the invention, wherein additional pipes and valves are added to the pressure ZADRA apparatus such that the two strip columns can be used in a serial as well as an alternating fashion for more efficient removal of gold from loaded activated carbon.

Referring to FIG. 5, therein is shown a schematic diagram of a split pressure ZADRA apparatus of the invention, which takes advantage of the dynamics of the pressure ZADRA curve of FIG. 4, to practice the split pressure ZADRA method of the invention for removal of gold from activated carbon loaded with gold. Split pressure ZADRA apparatus 308 comprises strip solution/carbon introduction system 23, strip column system 26, strip solution/carbon removal system 29, strip solution heating system 32, strip solution cooling system 35, electrowinning system 38, strip solution tank/pump system 41, and a crossover system 311.

Crossover System: Crossover system 311 comprises a pair of crossover pipe assemblies 314 and 317. Crossover pipe assembly 314 comprises a pipe 320 which connects outlet pipe 170 of piping system 164 to inlet pipe 191 of piping system 164, and a valve 323 disposed along pipe 320 to regulate the flow of strip solution therethrough. Crossover pipe assembly 317 comprises a pipe 326 which connects outlet pipe 173 of piping system 164 to inlet pipe 188 of piping system 164, and a valve 329 disposed along pipe 326 to regulate the flow of strip solution therethrough.

Operation of the Split Pressure ZADRA Apparatus

Figure 6:
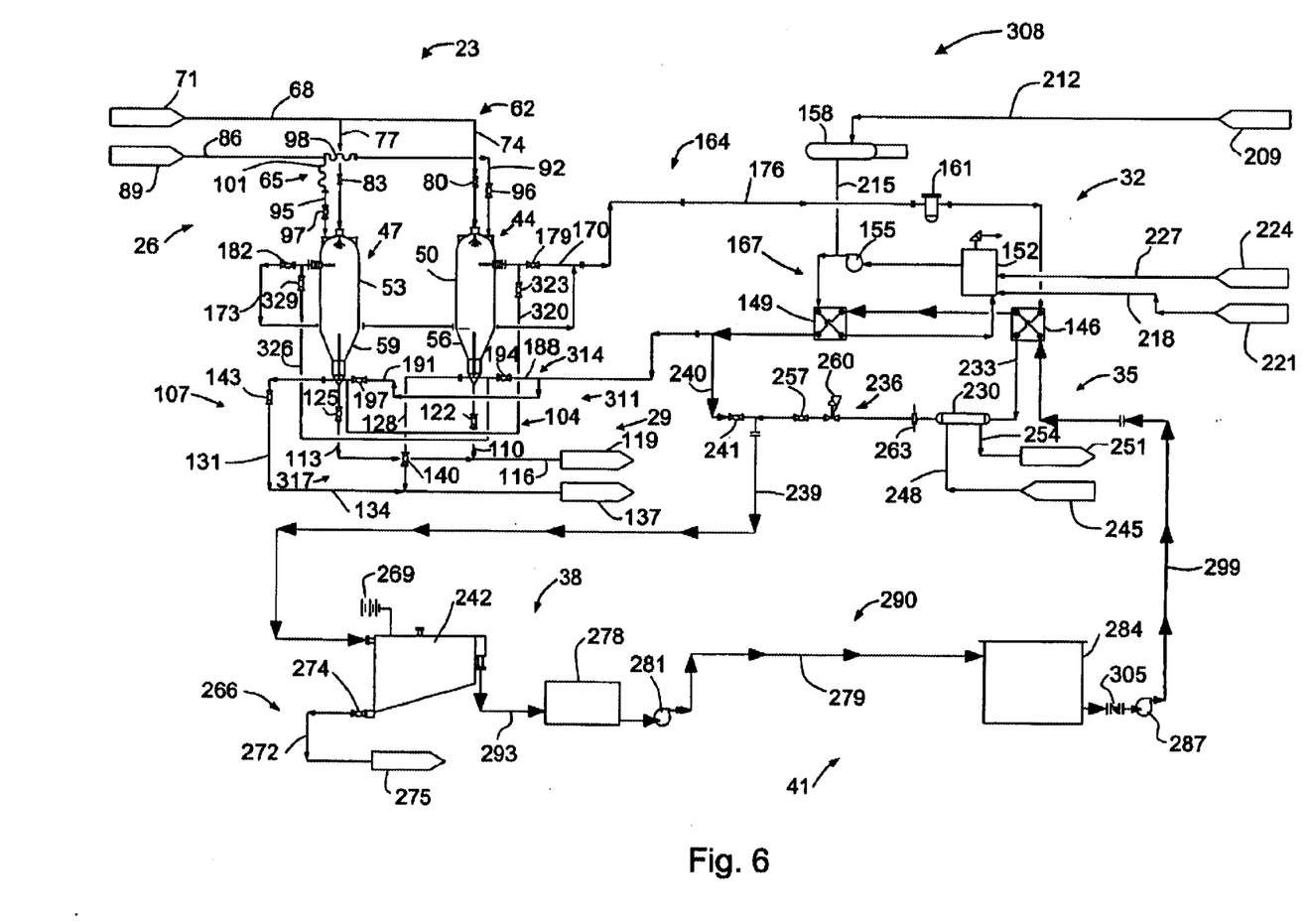
FIG. 6, a schematic diagram of the flow of strip solution through the split pressure ZADRA apparatus for preheating wherein strip solution is circulated solely through the electrowinning and heating equipment.

Referring to FIG. 6, split pressure ZADRA apparatus 308 is operated by firstly filling strip columns 44 and 47 with loaded activated carbon and filling the system with barren strip solution as described for pressure ZADRA apparatus 20. Next, split pressure ZADRA apparatus 308 is operated in a preheat cycle with the flow of the strip solution through split pressure ZADRA apparatus 308 shown by the arrows with valve 241 being open, and valves 80, 83, 96, 97, 122, 125, 140, 143, 179, 182, 194, 197, 257, 323, 329, and 350 being closed, until the strip solution is preheated sufficiently for stripping.

Figure 7:
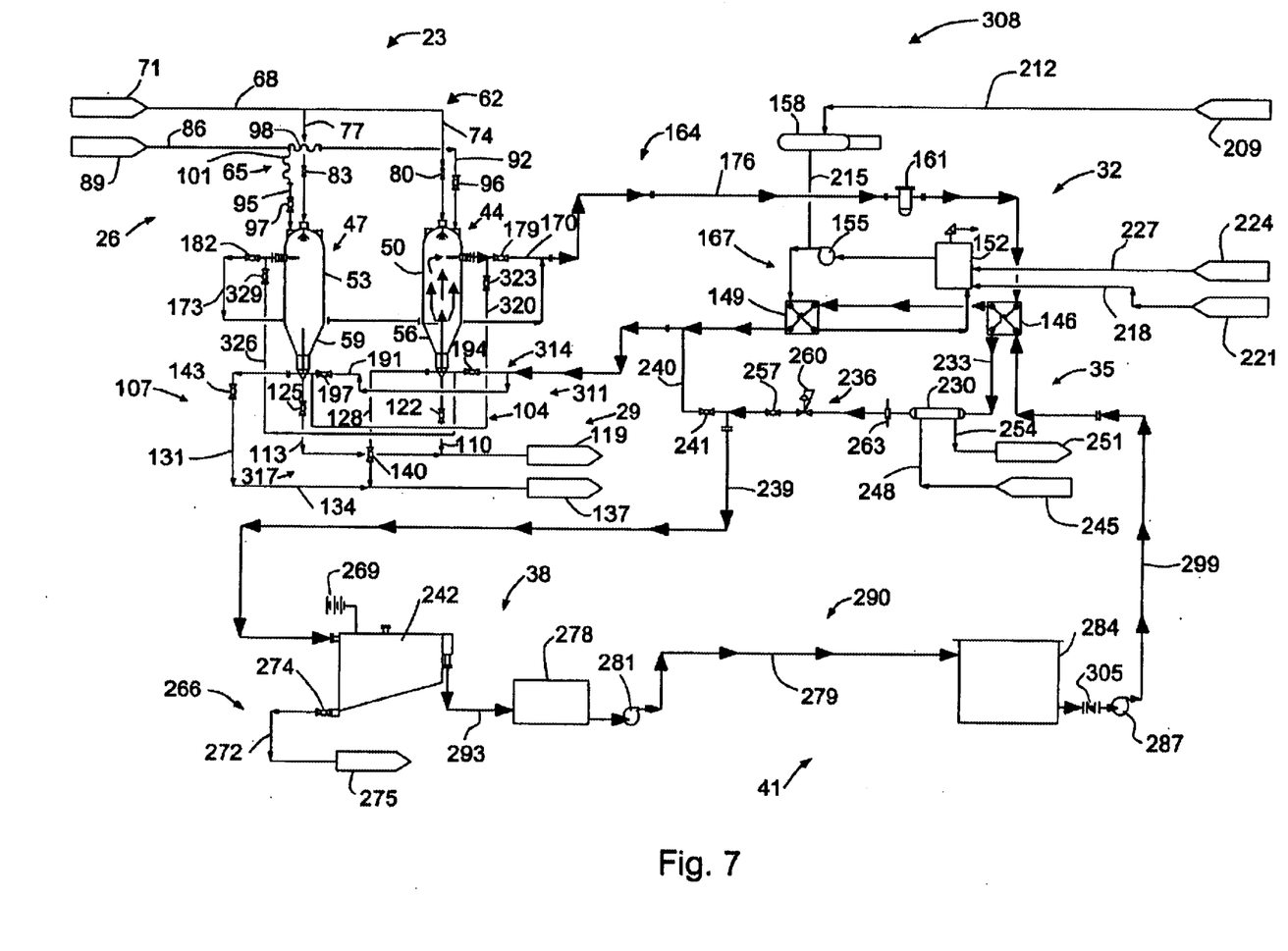
FIG. 7, a schematic diagram of the flow of strip solution through the split pressure ZADRA apparatus during the first strip phase wherein strip solution is circulated through the first strip column only.

First Strip Phase: Referring to FIG. 7, the flow of strip solution through split pressure ZADRA apparatus 308 during a first strip phase is shown by the arrows with valves 179, 194, and 257 being open, and valves 80, 83, 96, 97, 140, 143, 182, 197, 241, 323, 329, and 350 being closed. The flow pattern is the same as shown in FIG. 2 and thus will not be reexplained.

Figure 8:
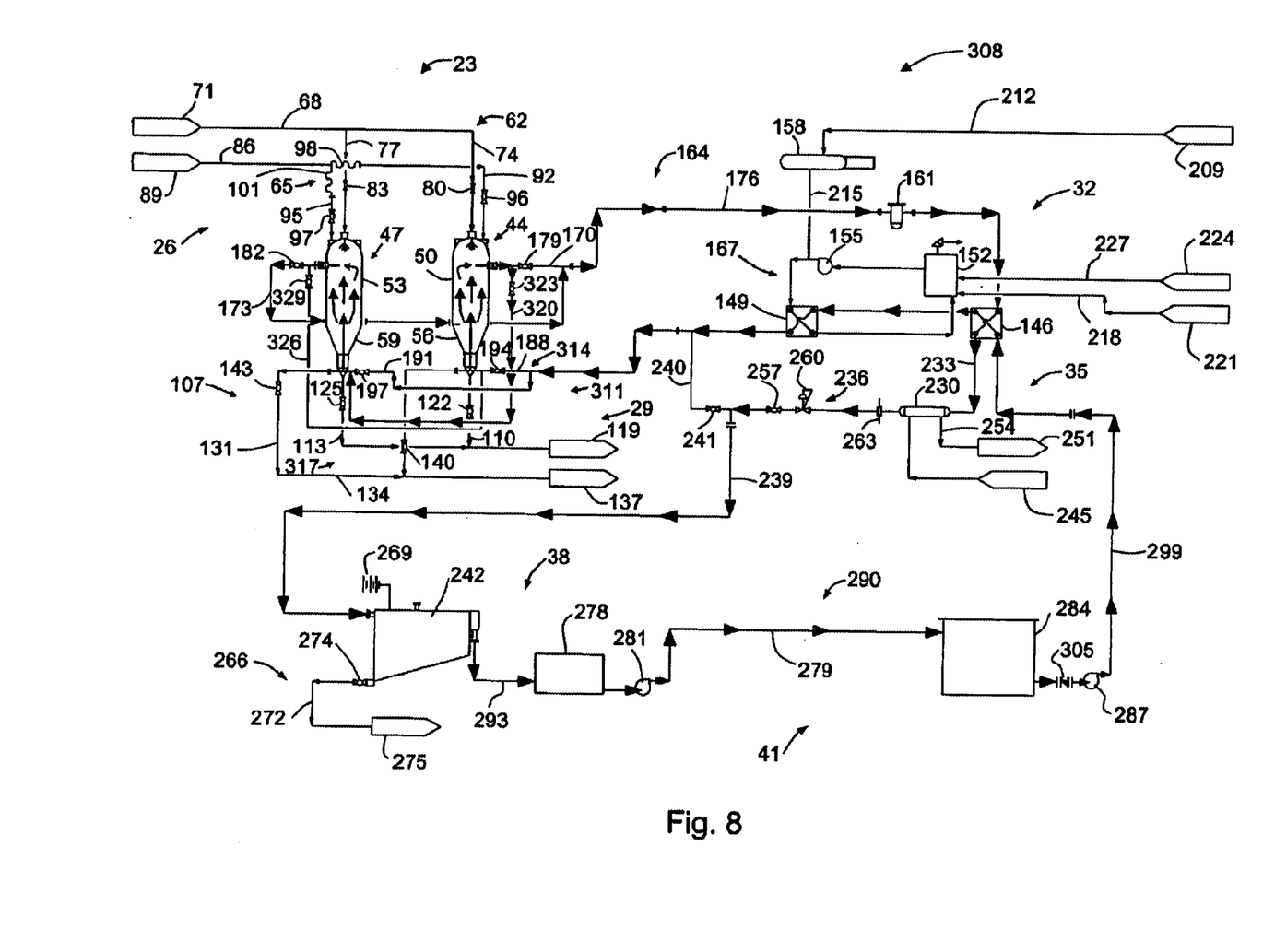
FIG. 8, a schematic diagram of the flow of strip solution through the split pressure ZADRA apparatus during the second strip phase wherein strip solution is circulated serially through the first strip column then the second strip column.

Second Strip Phase: Referring to FIG. 8, split pressure ZADRA apparatus 308 is operated in a second strip phase, with the flow of strip solution through split pressure ZADRA apparatus 308 shown by the arrows with valves 182, 194, 257, and 323 being open, and valves 80, 83, 96, 97, 140, 143, 179, 197, 241, 329, and 350 being closed. The flow pattern is the same as shown in FIG. 7 except at the strip columns 44 and 47 as hereinafter explained. Following heating of the barren strip solution in heat exchanger 146, the barren strip solution flows through open valve 194 into lower portion 56 of first strip column 44 flowing upwardly through the loaded activated carbon contained therein and exits as partially pregnant strip solution from upper portion 50 thereof through outlet pipe 170, pipe 320, and open valve 323 into lower portion 59 of second strip column 47. The strip solution flows upwardly through the loaded activated carbon contained in strip column 47 and exits as pregnant strip solution from upper portion 53 thereof through outlet pipe 173, open valve 182, pipe 176, and bucket trap 161 back through heat exchanger 146 and the cycle continues as previously explained.

Figure 9:
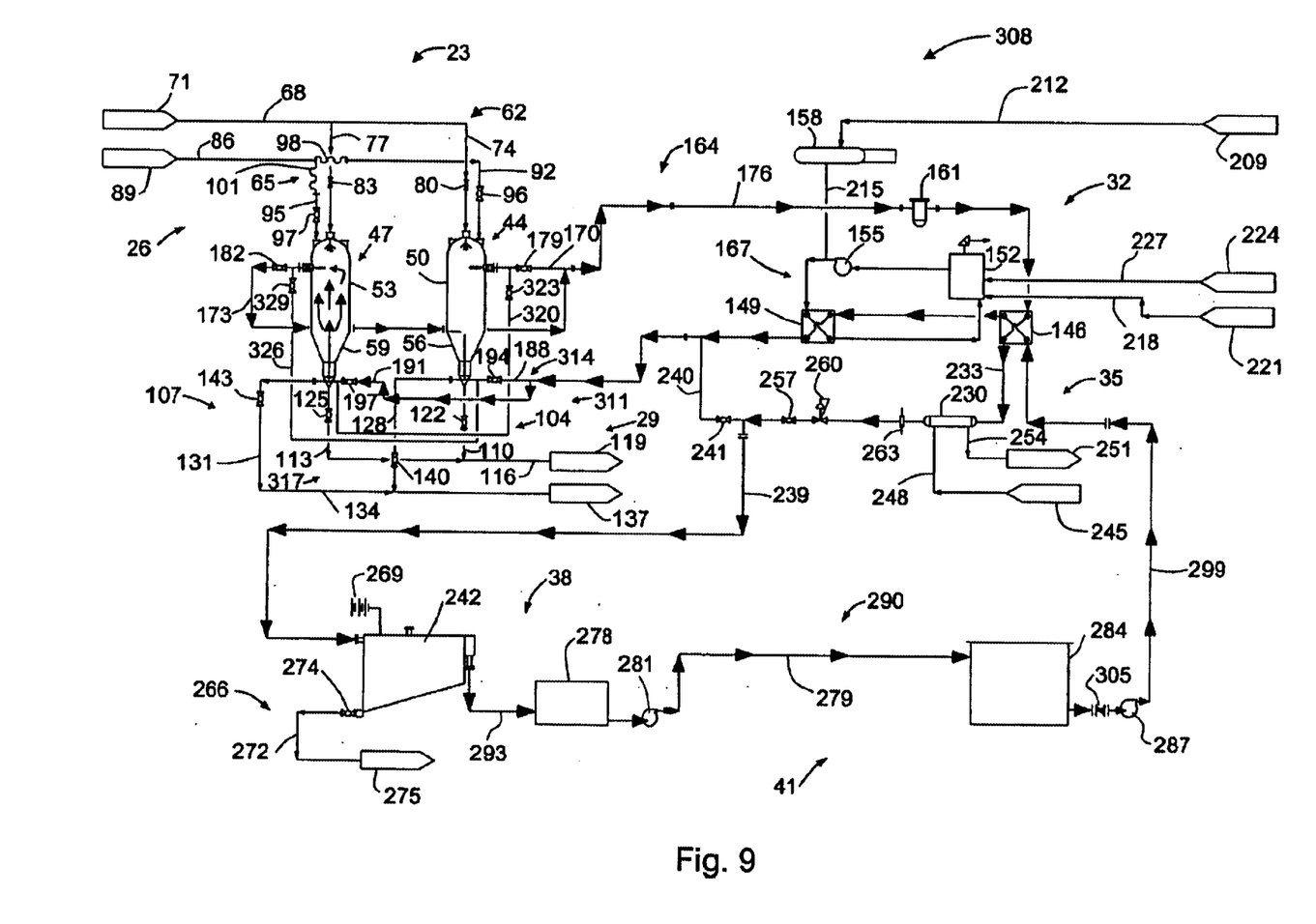
FIG. 9, a schematic diagram of the flow of strip solution through the split pressure ZADRA apparatus during the third strip phase wherein strip solution is circulated through the second strip column only.

Third Strip Phase: Referring to FIG. 9, split pressure ZADRA apparatus 308 is operated in a third strip phase with the flow of the strip solution through split pressure ZADRA apparatus 308 shown by the arrows with valves 182, 197, and 257 being open, and valves 80, 83, 96, 97, 140, 143, 179, 194, 241, 323, 329, and 350 being closed. The flow pattern is the same as that shown in FIG. 3 and thus will not be reexplained. The strip solution is drained and the stripped activated carbon is removed from strip columns 44 and 47 as previously described.

Utilizing Strip Solution Dynamics

The split pressure ZADRA apparatus and method reduce the time required to conduct two or more sequential strip cycles using the strip solution dynamics previously described and illustrated in FIG. 4 to effect the time savings. Using the pressure ZADRA method, the majority of adsorbed gold-cyanide complex is removed within four to six bed volumes (the apparent volume of activated carbon) of strip solution circulation, with the remaining gold-cyanide complex being removed in a second four to six bed volumes of strip solution circulation, for a total eight to twelve bed volumes of strip solution circulation required per strip cycle of each strip column. Conversely, the split pressure ZADRA method utilizes the second four to six bed volumes of the strip cycle in the first strip column as the first four to six bed volumes of the strip cycle in the second strip column.

Pairs of Sequential Batch Runs of Split Pressure ZADRA

The time savings of the split pressure ZADRA method versus the pressure ZADRA method for a pair of sequential column strip cycles is:

|  | Pressure ZADRA | | Split Pressure ZADRA | |
| --- | --- | --- | --- | --- |
|  | 1st Strip Cycle | 2nd Strip Cycle | 1st Strip Cycle | 2nd Strip Cycle |
| Phase I | 4 hours | 4 hours | 4 hours |  |
| Phase II | 4 hours | 4 hours | 4 hours* | 4 hours* |
| Phase III |  |  |  | 4 hours |
| Elapsed Time/Cycle | 8 hours | 8 hours | 8 hours | 8 hours |
| Sequential Time | 4 + 4 + 4 + 4 = 16 hours | | 4 + 4 + 4 = 12 hours | |

*conducted simultaneously

The time savings=[(16−12)/16]×100=25%. Therefore, the split pressure ZADRA method cuts the cycle time for a pair of sequential strip cycles twenty-five percent over the pressure ZADRA method. Likewise, a twenty-five percent savings in energy utilization is also realized over the pressure ZADRA method due to the reduction in cycle time.

Reversing the Order of the Phases

Figure 10:
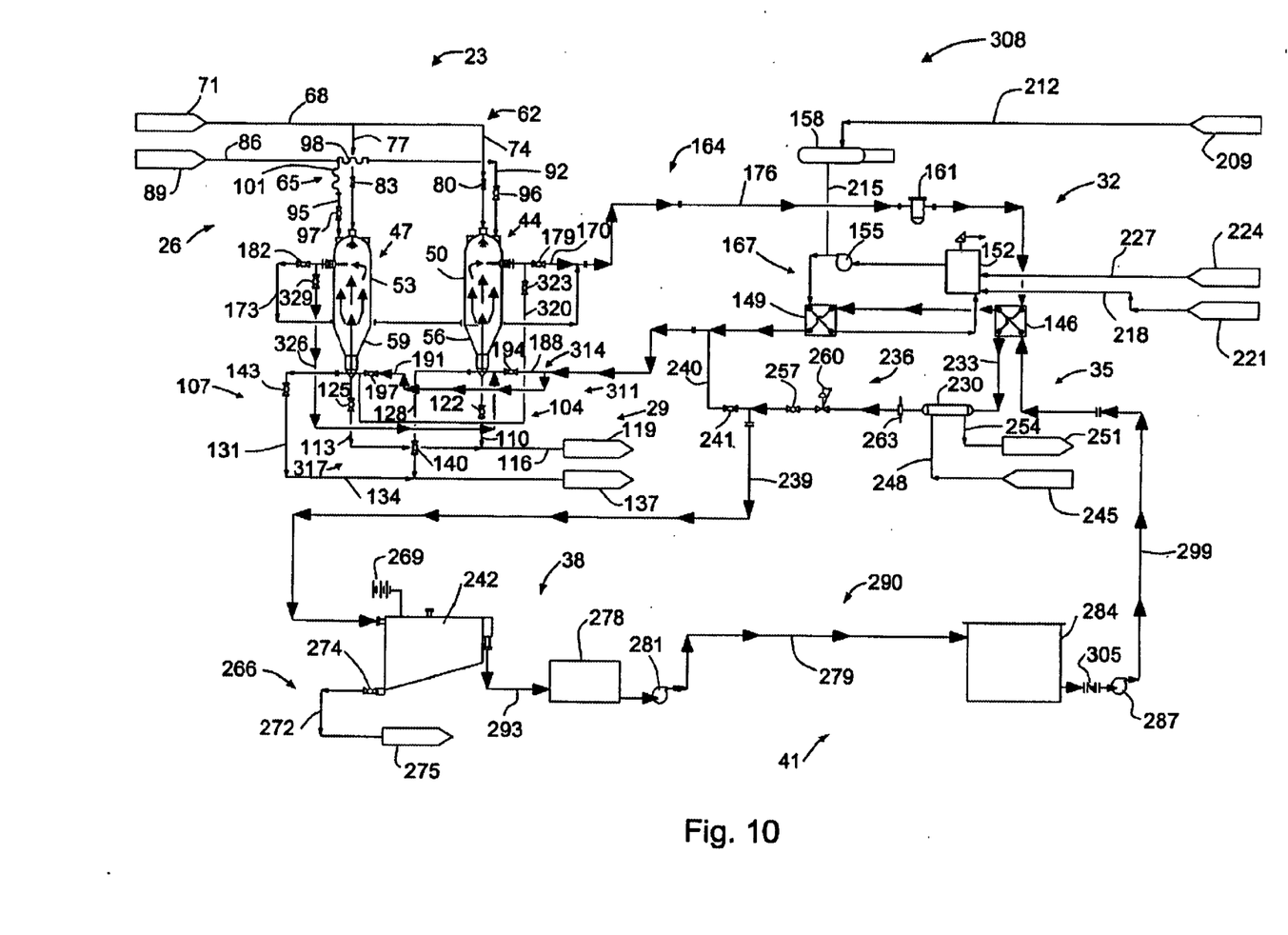
FIG. 10, a schematic diagram of the flow of strip solution through the split pressure ZADRA apparatus during an alternate second strip phase wherein strip solution is circulated serially through the second strip column then the first strip column.

The back-to-back split pressure ZADRA method can be conducted starting or ending at either strip column. For example, split pressure ZADRA apparatus 308 can be operated firstly in the third strip phase shown in FIG. 9 with the second strip column 47. Split pressure ZADRA apparatus 308 can then be operated in an alternate second phase as shown in FIG. 10 as explained below, opposite that shown in FIG. 8. Lastly, split pressure ZADRA apparatus 308 can be operated in the first strip phase shown in FIG. 7.

Alternate Second Phase

The flow of the strip solution through split pressure ZADRA apparatus 308 in the alternate second phase shown in FIG. 10 is shown by the arrows with valves 179, 197, 257, and 329 being open, and valves 80, 83, 96, 97, 140, 143, 182, 194, 241, 323, and 350 being closed. The flow pattern is slightly different from that shown in FIG. 8 at the strip columns 44 and 47 as hereinafter explained. Following heating of the barren strip solution in heat exchanger 146, the barren strip solution flows through open valve 197 into lower portion 59 of second strip column 47 flowing upwardly through the loaded activated carbon contained therein and exits as partially pregnant strip solution from upper portion 53 thereof through outlet pipe 173, pipe 326, and open valve 329 into lower portion 56 of first strip column 44. The strip solution flows upwardly through the loaded activated carbon contained in strip column 44 and exits as pregnant strip solution from upper portion 50 thereof through outlet pipe 170, open valve 179, pipe 176, and bucket trap 161 back through heat exchanger 146 and the cycle continues as previously explained. The strip solution is drained and the stripped activated carbon is removed from strip columns 44 and 47 as previously described.

Continuous Sequential Batch Runs of Split Pressure ZADRA

The split pressure ZADRA apparatus and method increase production by one-hundred-fifty to two-hundred percent over the pressure ZADRA apparatus and method without a significant cost in apparatus modifications. That is because multiple pairs of back-to-back, sequential strip cycles can be conducted such that after the second phase, wherein the gold-cyanide complex is completely stripped from the loaded activated carbon contained within first strip column, and during the third phase while the gold-cyanide complex is being stripped from the loaded activated carbon contained within the second strip column, the stripped activated carbon contained within first strip column can be removed and replaced with fresh loaded activated carbon for a subsequent strip cycle (i.e. the reloading time is less than the strip cycle time of each of the first, second, and third phases). Likewise, after the gold-cyanide complex is stripped from the loaded activated carbon contained within the second strip column, and during the following first phase while the gold is being stripped from the fresh loaded activated carbon contained within the first strip column, the stripped activated carbon contained within second strip column can be removed and replaced with fresh loaded activated carbon for a subsequent strip cycle, and so on.

Rather than running the three phases of the split pressure ZADRA method on a pair of batches of loaded activated carbon in first strip column 44 and second strip column 47, then unloading and reloading each of strip columns 44 and 47 with fresh loaded activated carbon, then running the three phases again, a greater time and energy savings can be realized wherein the first, second, and third strip phases are be repeated sequentially for an indefinite period of time. The first strip column 44 is unloaded of depleted activated carbon and reloaded with fresh loaded activated carbon while the loaded activated carbon in the second strip column 47 is being stripped in the second strip phase shown in FIG. 9. The second strip column 47 is likewise unloaded of depleted activated carbon and reloaded with fresh loaded activated carbon while the loaded activated carbon in the first strip column 44 is being stripped in the first strip phase shown in FIG. 7. The time and energy savings depends on the number of sequential strip cycles are run together.

The time and energy savings running four consecutive strip cycles is as follows:

| | Pressure ZADRA | | | |
| --- | --- | --- | --- | --- |
| | 1st Strip Cycle | 2nd Strip Cycle | 3rd Strip Cycle | 4th Strip Cycle |
| Phase I | 4 hours | 4 hours | 4 hours | 4 hours |
| Phase II | 4 hours | 4 hours | 4 hours | 4 hours |
| Phase III | | | | |
| Elapsed Time/Cycle | 8 hours | 8 hours | 8 hours | 8 hours |
| Sequential Time | 4 + 4 + 4 + 4 + 4 + 4 + 4 + 4 = 32 Hours | | | |

| | Split Pressure ZADRA | | | |
| --- | --- | --- | --- | --- |
| | 1st Strip Cycle | 2nd Strip Cycle | 3rd Strip Cycle | 4th Strip Cycle |
| Phase I | 4 hours | | 4 hours | |
| Phase II | 4 hours* | 4 hours* | 4 hours** | 4 hours** |
| Phase III | | 4 hours | | 4 hours |
| Elapsed Time/Cycle | 8 hours | 8 hours | 8 hours | 8 hours |
| Sequential Time | 4 + 4 + 4 + 4 + 4 + 4 + 4 = 24 Hours | | | |

*conducted simultaneously
**conducted simultaneously

Continuous Split Pressure ZADRA

Rather than running the three phases of the split pressure ZADRA method on a pair of batches of loaded activated carbon in first strip column 44 and second strip column 47, then unloading and reloading each of strip columns 44 and 47 with fresh loaded activated carbon, then running the three phases again, a greater time and energy savings can be realized wherein the first, second, and third strip phases are be repeated sequentially for an indefinite period of time. The first strip column 44 is unloaded of depleted activated carbon and reloaded with fresh loaded activated carbon while the loaded activated carbon in the second strip column 47 is being stripped in the second strip phase shown in FIG. 9. The second strip column 47 is likewise unloaded of depleted activated carbon and reloaded with fresh loaded activated carbon while the loaded activated carbon in the first strip column 44 is being stripped in the first strip phase shown in FIG. 7. The time and energy savings depends on the number of sequential strip cycles are run together.

The time and energy savings running four consecutive strip cycles is as follows:

| | Continuous Split Pressure ZADRA | | | |
| --- | --- | --- | --- | --- |
| | 1st Strip Cycle | 2nd Strip Cycle | 3rd Strip Cycle | 4th Strip Cycle |
| Phase I | 4 hours | | | |
| Phase II | 4 hours* | 4 hours* | | |
| Alt. Phase II | | 4 hours** | 4 hours** | |
| Phase II | | | 4 hours# | 4 hours# |
| Phase III | | | | 4 hours |
| Elapsed Time/Cycle | 8 hours | 8 hours | 8 hours | 8 hours |
| Sequential Time | 4 + 4 + 4 + 4 + 4 = 20 Hours | | | |

*conducted simultaneously
**conducted simultaneously
conducted simultaneously

Variations of the Split Pressure ZADRA Apparatus and Method

Many variations of the split pressure ZADRA apparatus and method are possible while staying within the same inventive concept. For example, while not preferred due to the substantially longer cycle time, the split pressure ZADRA apparatus and method can be operated and conducted at atmospheric pressure with a corresponding decrease in operating temperature of the strip solution, similar to the non-pressure standard ZADRA method. Likewise, other components known in the mining and related arts can be added to the apparatus and to practice the method.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

We claim:

1. A method for eluting a metal-cyanide complex comprising a gold-cyanide complex and/or silver cyanide complex from loaded activated carbon contained in respective first and second strip columns and recovering precious metal comprising respective gold and silver therefrom, the loaded activated carbon occupying respective first and second bed volumes of space in the first and second strip columns, respectively, the strip columns being selectively connectable in series and each strip column individually to an electrowinning device forming respective continuous loops, a strip solution being selectively flowable through the respective loops using a pump connected therewith, comprising the steps of:

flowing the strip solution in a first continuous loop as barren strip solution from the electrowinning device through the loaded activated carbon in the first strip column and back through the electrowinning device as pregnant strip solution thereby at least partially depleting the loaded activated carbon in the first strip column to produce partially depleted loaded activated carbon in the first strip column, while the strip solution simultaneously elutes the metal-cyanide complex from the loaded activated carbon, and the electrowinning device removes the precious metal from the eluted metal-cyanide complex in the strip solution;

flowing the strip solution in a second continuous loop as barren strip solution from the electrowinning device, through the partially depleted loaded activated carbon in the first strip column to produce substantially depleted activated carbon in the first strip column and through the loaded activated carbon in the second strip column thereby at least partially depleting the loaded activated carbon in the second strip column to produce partially depleted loaded activated carbon in the second strip column, and back through the electrowinning device as pregnant strip solution, while the strip solution simultaneously elutes the metal-cyanide complex from the loaded and partially depleted loaded activated carbon, and the electrowinning device removes the precious metal from the eluted metal-cyanide complex in the strip solution; and flowing the strip solution in a third continuous loop as barren strip solution from the electrowinning device through the partially depleted loaded activated carbon in the second strip column and back through the electrowinning device as pregnant strip solution, while the strip solution simultaneously elutes the metal-cyanide complex from the partially depleted loaded activated carbon, and the electrowinning device removes eluted precious metal from the eluted metal-cyanide complex in the strip solution.

2. A method according to claim 1, further comprising the step of preheating the strip solution to an elevated temperature prior to the step of flowing the strip solution in the first continuous loop by flowing the strip solution in a fourth continuous loop from the electrowinning device through one or more heating devices and back through the electrowinning device until the strip solution is heated to a temperature sufficient for stripping the loaded activated charcoal.

3. A method according to claim 1, wherein the step of flowing the strip solution in a first continuous loop comprises flowing between about four to six bed volumes of strip solution, wherein the step of flowing the strip solution in a second continuous loop comprises flowing between about four to six bed volumes of strip solution, and wherein the step of flowing the strip solution in a third continuous loop comprises flowing between about four to six bed volumes of strip solution.

4. A method according to claim 1, wherein the steps of flowing the strip solution in first, second, and third continuous loops is done using a strip solution which comprises an aqueous solution of about one percent by weight sodium hydroxide and between about one-tenth percent to three-tenths percent by weight sodium cyanide.

5. A method according to claim 1, further comprising the step of removing any depleted activated carbon from the first and second strip columns and loading a fresh batch of loaded activated carbon into each of said first and second strip columns prior to the step of flowing the strip solution in the first continuous loop.

6. A method according to claim 1, wherein the steps of flowing the strip solution in first, second, and third continuous loops are conducted with the strip solution at a temperature elevated above ambient temperature and at a pressure elevated above ambient pressure.

7. A method according to claim 6, wherein the steps of flowing the strip solution in respective first, second, and third continuous loops are conducted with the strip solution at a temperature of between about 138° C. to 149° C. and an absolute pressure of between about 400 kPa to 500 kPa.

8. A method according to claim 1, wherein the steps of the flowing strip solution in the first, second, and third continuous loops are repeated multiple times, said first and second steps each including removing the substantially depleted activated carbon from the respective first and second strip columns and loading a fresh batch of loaded activated carbon into said respective first and second strip columns prior to the step of flowing the strip solution in the respective first and second continuous loop.

9. A method according to claim 8, further comprising the step of preheating the strip solution to an elevated temperature prior to the step of flowing the strip solution in the first continuous loop by flowing the strip solution in a fourth continuous loop from the electrowinning device through one or more heating devices and back through the electrowinning device until the strip solution is heated to a temperature sufficient for stripping the loaded activated charcoal.

10. A method according to claim 8, wherein the step of flowing the strip solution in a first continuous loop comprises flowing between about four to six bed volumes of strip solution, wherein the step of flowing the strip solution in a second continuous loop comprises flowing between about four to six bed volumes of strip solution, and wherein the step of flowing the strip solution in a third continuous loop comprises flowing between about four to six bed volumes of strip solution.

11. A method according to claim 8, wherein the steps of flowing the strip solution in first, second, and third continuous loops is done using a strip solution which comprises an aqueous solution of about one percent by weight sodium hydroxide and between about one-tenth percent to three-tenths percent by weight sodium cyanide.

12. A method according to claim 8, wherein the steps of flowing the strip solution in first, second, and third continuous loops are conducted with the strip solution at a temperature elevated above ambient temperature and at a pressure elevated above ambient pressure.

13. A method according to claim 12, wherein the steps of flowing the strip solution in respective first, second, and third continuous loops are conducted with the strip solution at a temperature of between about 138° C. to 149° C. and an absolute pressure of between about 400 kPa to 500 kPa.

14. A method for eluting a metal-cyanide complex from loaded activated carbon contained in respective first and second strip columns and removing precious metal therefrom, the loaded activated carbon occupying respective first and second bed volumes of space in the first and second strip columns, respectively, the strip columns being selectively connectable in series and each strip column individually to an electrowinning device forming respective continuous loops, a strip solution being selectively flowable through the respective loops using a pump connected therewith, comprising the steps of:

flowing the strip solution in a first continuous loop as barren strip solution from the electrowinning device through the loaded activated carbon in the first strip column and back through the electrowinning device as pregnant strip solution thereby at least partially depleting the loaded activated carbon in the first strip column to produce partially depleted loaded activated carbon in the first column, while the strip solution simultaneously elutes the metal-cyanide complex from the loaded activated carbon, and the electrowinning device removes the precious metal from the eluted metal-cyanide complex in the strip solution;

flowing the strip solution in a second continuous loop as barren strip solution from the electrowinning device, through the partially depleted loaded activated carbon in the first strip column to produce substantially depleted activated carbon in the first strip column and through the loaded activated carbon in the second strip column thereby at least partially depleting the loaded activated carbon in the second strip column to produce partially depleted loaded activated carbon in the second strip column, and back through the electrowinning device as pregnant strip solution, while the strip solution simultaneously elutes the metal-cyanide complex from the loaded and partially depleted loaded activated carbon, and the electrowinning device removes the precious metal from the eluted metal from the strip solution;

flowing the strip solution in a third continuous loop as barren strip solution from the electrowinning device through the partially depleted loaded activated carbon in the second strip column to produce substantially depleted activated carbon in the second strip column and back through the electrowinning device as pregnant strip solution, while the strip solution simultaneously elutes the metal-cyanide complex from the partially depleted loaded activated carbon, and the electrowinning device removes eluted precious metal from the eluted metal-cyanide complex in the strip solution; and wherein the step of flowing the strip solution in the first, second, and third continuous loop are repeated multiple times and each include removing the substantially depleted activated carbon from the respective first and second strip columns and loading a fresh batch of loaded activated carbon into said respective first and second strip columns prior to the step of flowing the strip solution in the respective first and second continuous loop.

15. A method according to claim 14, further comprising the step of preheating the strip solution to an elevated temperature prior to the step of flowing the strip solution in the first continuous loop by flowing the strip solution in a fourth continuous loop from the electrowinning device through one or more heating devices and back through the electrowinning device until the strip solution is heated to a temperature sufficient for stripping the loaded activated charcoal.

16. A method according to claim 14, wherein the step of flowing the strip solution in a first continuous loop comprises flowing between about four to six bed volumes of strip solution, wherein the step of flowing the strip solution in a second continuous loop comprises flowing between about four to six bed volumes of strip solution, and wherein the step of flowing the strip solution in a third continuous loop comprises flowing between about four to six bed volumes of strip solution.

17. A method according to claim 14, wherein the steps of flowing the strip solution in first, second, and third continuous loops is done using a strip solution which comprises an aqueous solution of about one percent by weight sodium hydroxide and between about one-tenth percent to three-tenths percent by weight sodium cyanide.

18. A method according to claim 14, wherein the steps of flowing the strip solution in first, second, and third continuous loops are conducted with the strip solution at a temperature elevated above ambient temperature and at a pressure elevated above ambient pressure.

19. A method according to claim 18, wherein the steps of flowing the strip solution in respective first, second, and third continuous loops are conducted with the strip solution at a temperature of between about 138° C. to 149° C. and an absolute pressure of between about 400 kPa to 500 kPa.

* * * * *